(12) United States Patent
Berg et al.

(10) Patent No.: US 6,428,707 B1
(45) Date of Patent: Aug. 6, 2002

(54) ADSORPTION/SEPARATION METHOD AND A MEDIUM FOR ADSORPTION/SEPARATION

(75) Inventors: Hans Berg; Hasse Hansson; Lennart Kagedal, all of Uppsala (SE)

(73) Assignee: Amersham Pharmacia Biotech AB, Uppsala (SE)

( * ) Notice: Subject to any disclaimer, the term of this patent is extended or adjusted under 35 U.S.C. 154(b) by 0 days.

(21) Appl. No.: 09/380,051
(22) PCT Filed: Feb. 3, 1998
(86) PCT No.: PCT/SE98/00189
§ 371 (c)(1),
(2), (4) Date: Mar. 13, 2000
(87) PCT Pub. No.: WO98/33572

PCT Pub. Date: Aug. 6, 1998

(30) Foreign Application Priority Data

Feb. 4, 1997 (SE) .............................................. 9700383

(51) Int. Cl.$^7$ .............................................. B01D 15/00
(52) U.S. Cl. ...................................................... 210/661
(58) Field of Search ......................................... 210/661

*Primary Examiner*—Chester T. Barry
(74) *Attorney, Agent, or Firm*—Royal N. Ronning, Jr.; Robert F. Chisholm; Stephen G. Ryan

(57) ABSTRACT

A method for adsorption of a substance from a liquid sample on a fluidized bead or stirred suspension, in which the beads used comprise a base matrix and exhibit a structure having affinity to the substance, characterized in that the structure is covalently bound to the base matrix via an extender. Populations of beads in which the beads contain a filler incorporated in a base matrix and an extender are also described.

27 Claims, No Drawings

ADSORPTION/SEPARATION METHOD AND A MEDIUM FOR ADSORPTION/ SEPARATION

TECHNICAL FIELD AND EARLIER KNOWN TECHNIQUES

General About the Technical Field of the Invention

The invention relates to a process for the separation of a substance by adsorption to non-packed beds containing beads which exhibit structures (ligands) with affinity to the substance. Non-packed beds may be generated by expanding/fluidizing sedimented beads by an upward or a downward flow of fluid, the direction of flow being depending on the density of the beads used. A liquid sample containing the substance to be adsorbed is introduced into the flow after expansion. A less effective non-packed bed is generated by agitating suspendible beads with the aid of a turbulent flow or by mechanical stirring.

By selecting a bead population which includes beads varying in sizes and/or densities and using this population in an expanded bed, it is possible to obtain a so-called classified bed in which larger beads and beads with higher densities are located below smaller beads and beads with lower densities. The backmixing in these type of beds becomes low and they have been named stable expanded beds (sometimes stable fluidized beds). An alternative way of stabilizing a fluidized bed is by incorporating magnetic filler particles into the beads and apply a magnetic field during the fluidization. Stabilization by a magnetic field is an example that stable expanded beds can be achieved without using beads covering a certain size/density range. The adsorption in stable fluidized beds will take place during plug flow as in a chromatographic process in a packed bed. The number of theoretical plates will be high. In case the non-packed bed is generated by a turbulent flow or by agitation, backmixing will be high and the adsorption will take place in a batch-wise mode. For a short, recent survey of the field, see the introductory part of Thommes et al., Biotechnol. Bioengin. 48 (1995) 367–374.

Back-mixing in a bed is often measured as axial dispersion ("vessel dispersion number"), see Levenspiel, "Chemical Reaction Engineering" 2nd Edition, John Wiley & Sons (1972). For stable expanded beds, the vessel dispersion number will preferably be $<75\times10^{-3}$, more preferably $<20\times 10^{-3}$, which corresponds $>5$, more preferably $>30$ theoretical plates. For total back-mixing, the number of plates will be 1.

Expansion/fluidization of the bed is normally effected in a column having provided at each of its ends a net structure covering the cross-sectional area of the column, or some other perforated device which will not generate turbulence in the flow. See, for instance, WO-A-9218237 (Pharmacia Biotech AB, Uppsala, Sweden). The similar effect has also been claimed for a system utilizing a stirred inlet flow (WO-A-9200799; Kem-En-Tek/Upfront Chromatography A/S). Also other distributors are likely to be feasible.

Subsequent to adsorption, elution can be effected directly from the expanded bed. Alternatively, the bed may be allowed to settle and adsorbed material eluted from the bed with the aid of a fluid flow often introduced in a direction opposite to that in which the bed was expanded.

The fluid is often aqueous (for instance buffers dissolved in water), but also other liquids may be used.

BACKGROUND PUBLICATIONS

Pharmacia Biotech AB (Uppsala, Sweden) markets Streamline® which in its first version utilized porous beads of agarose with quartz particles as filler material (WO-A-9218237, Pharmacia Biotech AB). In a later version, the quartz particles were replaced with fillers of higher densities than quartz (PCT/SE96/01431, filed with priority from Nov. 7, 1995, Pharmacia Biotech AB). Another main supplier is Bioprocessing Ltd. (Durham, England) whose porous glass beads (Prosep®) can be used for chromatography on expanded beds (Beyzavi et al, Genetic Engineering News, Mar. 1, 1994 17)). Still another supplier is Sepracor.

U.S. Pat. No. 4,976,865 (Sanchez, et al, CNRS) teaches fluidized beds and the use of segmented columns to mimic the multi-step adsorption taking place in packed as well as stabilized expanded beds. The beads used in the experimental part are glass particles (Spherosil) that have been coated.

WO-A-9200799 (Kem-En-Tek; Upfront Chromatography) discloses a large number of fillers and polymeric materials that can be combined to produce beads intended for adsorption in fluidized beds. Each bead contains two or more filler particles.

WO-A-8603136 (Graves and Burns; University Patents Inc) discloses beads containing magnetic filler particles and their use in fluidized beds stabilized by an externally applied magnetic field. See also Burns et al., Biotechnol. Bioengin. 27 (1985) 137–145; and Lochmüller et al., J. Chem. Tech. Biotechnol. 40 (1987) 33–40.

In chromatography on packed beds it has earlier been suggested to use porous beads, the pores of which wholly or partly have been filled with hydrophilic gels carrying affinity ligands, such as ion exchange groups. One example is Macrosob-K which is macroporous kieselguhr which has been filled with agarose which in turn has been derivatized to exhibit DEAE or CM ion exchange groups (Macrosorb-KAX.DEAE and Macrosorb-KAX.CM, respectively (GB-A-1,586,364, Miles). This latter type of materials have also been applied in fluidised bed chromatography (Bite et al., In: Verrall et al., Separations for Biotechnology (1987), Elles Horwood Ltd, Chapter 13, 193–199.

Lochmüller et al., Sep. Sci. Techn. 22(11) (1987) 2111–2125 discloses a comparative study of adsorptions on a packed bed, a fluidized bed in the quiescent state and a magnetically stabilized bed. The beads used are made of Amberlite XAD, which have been coated adsorptively with a synthetic polymer whereafter an affinity ligand for the substance to be adsorbed has been linked to one terminal end of the polymer. Magnetic particles are present in the coat.

Problems Related to Earlier Fluidized Bed System

In the case of adsorption processes on expanded and/or fluidized beds, there is an expressed desire to have the highest possible productivity. Important variables that should be taken into acoount to achieve this is to use beads with the highest possible breakthrough capacity for the substance to be adsorbed and also to increase the flow rate. However, increasing the flow rate leads to decreased breakthrough capacity and also an increased risk for elutriation of beads. One way of solving the elutriation problem is to increase the density of the beads by including filler materials in them. However, filler material as a rule will have a detrimental effect on breakthrough capacity, the size of this effect being dependent on various factors such as the flow rate, the pore size of the beads, the structure that binds the substance to be adsorbed, the substance to be adsorbed etc.

One way of increasing the breakthrough capacity for filler matrices in bead form has recently been presented in International Patent Application PCT/SE96/01431 (Pharmacia Biotech AB), the content of which is hereby incorporated by reference. See below.

OBJECTIVES OF THE INVENTION

A first objective is to improve total yields in adsorption processes on fluidized beds.

A second objective is to improve productivity for adsorption processes on fluidized beds.

A third objective is to provide filler matrices that have improved breakthrough capacity in fluidized beds.

THE INVENTION

We have now realized that the above-mentioned problems can be solved by utilizing beads in which the affinity structure/ligand is linked to the base matrix of the beads via an extender.

The positive effect caused by an extender is believed to reside in the fact that it will provide the inner surfaces (pore surfaces) and/or outer surfaces of the beads with a flexible polymer layer that is permeable to macromolecules and other molecules allowed to pass the bed. This will cause an increase in the effective interacting volume as well as in the steric availability of the affinity structures/ligands for the substance to be adsorbed. This in turn will increase the mass transfer rate as well as the total capacity available.

Accordingly the first aspect of the invention is an separation method on a fluidized bed or on a stirred suspension as described above. The characteristic feature is that the affinity structure utilised is attached to the base matrix via an extender. Preferentially the attachment is covalent, meaning that in the preferred mode there is no non-covalent link between the affinity structure and the base matrix.

The Extender

Suitable extenders should be hydrophilic and contain a plurality of groups selected, for instance, among hydroxy, carboxy, amino, repetitive ethylene oxide (—$CH_2CH_2O$—), amido etc. The extender may be in the form of a polymer such as a homo- or a copolymer. Hydrophilic polymeric extenders may be of synthetic origin, i.e. with a synthetic skeleton, or of biological origin, i.e. a biopolymer with a naturally occurring skeleton. Typical synthetic polymers are polyvinyl alcohols, polyacryl- and polymethacrylamides, polyvinyl ethers etc. Typical biopolymers are polysaccharides, such as starch, cellulose, dextran, agarose. The preferred polymeric extenders are often water-soluble in their free state, i.e. when they are not attached to the base matrix. Water-insoluble polymers or polymers of low original hydrophilicity may have been rendered more hydrophilic by introducing hydrophilic groups on them. In particular so called polyhydroxy polymers and other polymers lacking polypeptide structure are believed to be preferred.

The length (size) of the optimal extender will depend on several factors, such as number of attachment points to the base matrix of the beads, type of extender, the structure and size of the affinity ligand as well as the number thereof per extender molecule, crosslinking degree etc. The flexibility of the layer formed by the extender will be increased for a decrease in the number of attachment points to the base matrix per extender molecule and/or in the degree of crosslinking of the extender. Extenders enabling one-point attachment, for instance at a terminal monomeric unit, may be small. For polymeric extenders for which attachment and/or crosslinking is possible at several monomeric units, it is believed that larger extenders are preferred. For the above-mentioned type of polymers, for instance, it is believed that the most suitable polymers should contain at least 30 monomeric units, which for polysaccharides like dextran indicates a Mw>5000 Da.

In order to control the flexibility of the extender, it is often advantageous to first activate the base matrix and then link the extender to the matrix by reaction with the activated groups introduced. Typical activation reagents are bifunctional in the sense that they are able to react twice with electrophilic functional groups. Illustrative examples are epihalohydrins, bisepoxides, CNBr etc. Other bifunctional reagents require an intermediary activation reaction, for instance allyl glycidyl ether and styryl glycidyl ether. For the latter reagents the first reaction takes place at the oxirane group whereafter activation is caused by addition of halogen ($X_2$, OH or other compounds providing positive halogen) to the carbon-carbon double bond. The bifunctional reagents often give rise to a stable bridge between the extender and the base matrix, which in the preferred cases contains a straight or branched hydrocarbon chain that is broken by one or more oxygen atoms (ether structures) or amino nitrogens and optionally also substituted with one or more hydroxy or amino groups. The preferred bifunctional reagents should give rise to bridges that are stable against hydrolysis in the pH interval used in liquid chromatography, i.e. in most cases pH 3–12. This often means that the bridge should be devoid of ester groups and groups of similar or less hydrolytic stability, for instance the bridges should have at most one oxygen or nitrogen atom linked to one and the same carbon atom. Typically, the bridge has a length that is less than 30 atoms.

If properly utilized, the bifunctional reagent used for attaching the extender to the base matrix will cause no or a very low number of intra- and intermolecular crosslinks in the extender.

Affinity Structures/ligands

Affinity properties may be inherent in the structure of the extender or may be introduced by chemical coupling of the appropriate ligand structures/groups (affinity ligands) to the extender. This means that the extender often is substituted with one, in the preferred case two or more, ligands/groups that have affinity for the substance/substances intended to be adsorbed. Typical affinity ligands/groups are:

1. Positively charged groups (primary, secondary, tertiary or quaternary amine groups).
2. Negatively charged groups (for instance carboxy, phosphonic acid, sulphonic acid, etc.).
3. Amphoteric groups.
4. Groups having a specific affinity (for instance bioaffinity groups), such as between IgG-binding protein (Protein A, G, L, etc.) and IgG, lectin and carbohydrates, antigen/hapten and antibody, (strep) avidin and biotin.
5. Complementary nucleic acids/oligonucleotides).
6. Groups which exhibit π-electron systems.
7. Chelate groups.
8. Hydrophobic groups, etc.

With the aid of these affinity ligands/structures, the inventive method can be performed as affinity chromatography, such as ion-exchange chromatography, biospecific affinity chromatography, hydrophobic interaction chromatography, "reverse phase chromatography", chelate chromatography, covalent chromatography, etc or corresponding batch mode adsorptions.

The ligand may be introduced before or after the extender has been attached to the surface of the base matrix. One way of doing this contemplates reacting the appropriate group of the extender, such as carboxy, amino, hydroxy, etc, with a suitable bifunctional reagent, such as CNBr, bisepoxide or corresponding epihalohydrin, allyl glycidyl ether etc, to introduce the desired reactivity which in turn is reacted with a compound that will introduce the affinity concerned. In case the compound exhibits a group reactive with a group on the extender no extra derivatization of the extender is required. The conditions and reagents should be selected so as to minimize cross-linking of the extender.

The introduction of the affinity ligand often contemplates inserting a linker between the ligand and the extender. Such linkers are often hydrophilic in the sense that they contain a straight, branched or cyclic hydrocarbon chain which may be broken by oxygen (ether) and/or nitrogen (amino) atoms and/or substituted with hydroxy and/or amino groups. The demands on the linker mostly is the same as on the bridge attaching the extender to the base matrix. See above.

The poor effect obtained with native protein A may be explained in terms of optimal ratios between the size of the extender and the affinity structure/group. Compare that native Protein A is much greater then the extender used in the experimental part (Example 11) (dextran Mw 10,000 Da). This also points to the fact that with the present knowledge it is believed that the largest effects with the invention will be achieved for smaller affinity groups that normally are found among groups 1, 2, 3, 6, 7 and 8 as defined above. Suggestive-wise the ratio between the Mws for the affinity structure and the naked extender should be less than 1, such as less than 0.1.

Base Matrices

The base matrix of the beads may be of organic or inorganic nature as known for beads used in chromatography on fluidized and packed beads. It may be porous or non-porous. It is often a polymer, such as glass, a synthetic polymer or a biopolymer. The base matrix may be a hydrophobic polymer, for instance a styrene-divinyl benzene copolymer, which has been hydrophilized on inner and/or outer surfaces by being coated with the appropriate hydrophilic polymer (often a polymer exhibiting hydroxy and/or amino groups) or by other means, for instance oxidized to introduce hydrophilic groups of the type given above. Alternatively, the base matrix may be a water-insoluble hydrophilic polymer, for instance agarose, cellulose, dextran starch, etc., which has been cross-linked to give the desired porosity and stability, if necessary. At the priority date, agarose was the polymer of choice, preferably in cross-linked form. For further discussion about selection of polymers in base matrices, see WO-A-9200799 (Kem-En-Tek A/S/Upfront Chromatography A/S), WO-A-9218237 (Pharmacia Biotech AB), PCT/SE96/01431 (Pharmacia Biotech AB) and WO-A-8603136 (Graves & Burns, University Patents Inc).

Density of Beads and Filler Materials

For upward fluidization, the density of the final beads (mean density, wet state) shall be higher than the density of the fluid in which the beads are to be used, i.e. for aqueous fluids >1 g/cm$^3$, for instance $\geq$1.1 g/cm$^3$, such as $\geq$1.2 g/cm$^3$, (measured in the buffer used to maintain the bed in a fluidized state). For downward fluidization, the opposite applies, i.e. the density of the final beads (mean density, wet state) shall be lower than the density of the fluid in which the beads are to be used, i.e. for aqueous fluids >1 g/cm$^3$. For stirred suspension the density of the beads is less critical.

The beads used in the inventive method may or may not comprise filler material in order to give the beads the appropriate density for the intended us. The filler material may be magnetic or non-magnetic.

Some bead matrix materials, such as porous glass beads and other porous inorganic materials, may have by themselves the appropriate density in the wet state and therefore do not need to contain a filler for controlling the density.

Organic polymers, on the other hand, often has a density close to the densities of the fluids used in the adsorption processes contemplated. In this case it is often of great advantages to incorporate filler particles as known in the art for fluid bed adsorptions, see WO-A-9200799 (Kem-En-Tek A/S/Upfront Chromatography A/S), WO-A-9218237 (Pharmacia Biotech AB) and PCT/SE96/01431 (Pharmacia Biotech AB). One, preferably two or more, particles are introduced per bead. Depending on direction of the flow for fluidization (downward or upward), the filler should have a density lower or higher, respectively, than the fluid to be used. For aqueous fluids this means <1 g/cm$^3$ (downward) or >1 g/cm$^3$ (upward). Typical fillers are particles of glass, quartz and silica, metals, metal salts, metal alloys etc. See further WO-A-920799 (Kem-En-Tek A/S/Upfront Chromatography A/S) and WO-A-9218237 (Pharmacia Biotech AB). For flow rates >300–400 cm/h (upward direction), the density of the filler should be $\geq$3 g/cm$^3$, with the preferred filler materials being heavy metals.

The particle size of the filler material is normally within the range of 1–200 $\mu$m, with the provision that it always is less than the beads. For filler materials to be used in porous beads and having dens Vies $\geq$3 g/cm$^3$, typical particle sizes are 1–70 $\mu$m, with a preference to a range of 15–50 $\mu$m.

For porous beads, the geometrical shape of the filler particles is important. Preferred shapes include spheres, ellipsoids, droplets, noodle shapes, bean shapes and aggregates/agglomerate of this forms of particles. A particular preference is given to continuously rounded shapes. See further PCT/SE96/01431 (Pharmacia Biotech AB). This becomes particularly important in case the pore sizes permit penetration of the substance(s) to be adsorbed.

The filler content of the beads is determined by factors such as the desired density and capacity of the final beads, flow rates to be used, type and density of filler material, ligand, substance to be adsorbed etc. Typical optimal filler contents are to be found in the range 1–100% (w/w, wet beads).

Bead Size

The population of beads used in each particular application may be monodisperse or contains beads covering a certain size range with a certain bead size distribution and mean bead size. Suitable mean bead sizes and size ranges are typically found within the range of 10–1,000 $\mu$m, with preference to a range of 50–700 $\mu$m. In many cases of fluidized beds (expanded beds), the lower limit is determined by the fact that the beads shall not be able to escape through the outlet or the inlet of the vessel used for fluidizing. Other factors which influence the choice of bead sizes include the desired capacity, the ligand concerned, the specific substance or substances to be adsorbed from the sample etc.

The ratio between the total surface area of the beads (inner plus outer surfaces) and the total bead volume is highly significant to breakthrough capacity. Larger relative contact surface areas (small beads) lead to a higher breakthrough capacity. The total capacity, on the other hand, is only marginally affected.

For expanded beds stabilized by a flow evenly distributed across the cross-sectional area of the bed, typical bead size distributions are such that 95% of the beads fall within a range whose width is 0.1 to 10 times the mean bead diameter, preferably 0.3 to 3 times the mean bead diameter. The exact particle size distribution to be selected will depend on Factors, such as flow rate, mean bead diameter, density of beads, density of fluid etc. A too wide particle size distribution will result in an increased risk for elutriation and/or sedimenting of large proportions of beads. The size distribution may be unsymmetrical, for instance the proportion of beads in the lower part of a range can be larger than the proportion in the upper part. Although less preferred with present production technology, a future alternative to size distribution in this particular application is to have a distribution in the densities of the beads used. Bead populations in which both the size and the density of the individual beads vary can also be used.

For magnetically stabilized fluidized beds or turbulent fluidized beds and stirred suspensions, the demand for a size and/or a density distribution within the bead population used is less critical. In these cases also monodisperse bead populations may be used.

Porosity of Beads

It is preferred that the final beads are porous with open pores allowing the substance to be adsorbed to penetrate the internal of the beads. Optimal porosity can be determined from the size of the substance or substances to be adsorbed. It appears as if the extender in some unknown way would facilitate transportation of substances within the beads. It is therefore believed that the range for acceptable Kav-values are broader than for beads without extenders, i.e. 0.1–0.95 compared to 0.40–0.95 without extenders. For a definition of Kav see L. Hagel in "Protein Purification, Principles, High Resolution, and Applications", J-C Janson and L Rydén (Eds), VCH Publishers Inc. New York, 1989, p. 99.

Samples to be Applied

The samples to be applied in the inventive method may be of the same type as those earlier applied in chromatographic processes on packed and non-packed beds, or in batch adsorption processes on turbulent fluidized beds and agitated suspensions. The inventive beads and methods can be applied to the treatment of processed and unprocessed supernasants/culture media from fermentors and other cell culture vessels, serum, plasma, beverages etc.

Either the adsorbed substance or the sample is further processed.

The invention will function for the separation of compounds of various molecular weights and types. Examples are macromolecules, e.g. with molecular weights $\geq 5,000$ Dalton, such as polysaccharides, proteins/polypeptides and nucleic acids and synthetic water-soluble polymers. Also substances with molecular weight $\leq 5,000$ Daltons may be adsorbed according to the invention. There is normally no upper limit in molecular weight, even though the process is normally limited to the adsorption/separation of compounds that have a molecular weight below 1,000,000.

Miscellaneous Aspects of the Manufacture of Beads

The manufacture of the base matrix beads, introduction of binding groups, addition of filler, etc., are effected in a known manner, while ensuring that the beads will be suited for adsorption purposes in accordance with the aforegoing. The beads are sieved, when necessary, to obtain a suitable size fraction.

A Second Aspect of the Invention

A second aspect of the invention, is a population of beads containing filler material (bead fraction) according to the above, which is suitable for use as a matrix in adsorption/separation processes, particularly chromatographic processes, effected on expanded/fluidized beds in accordance with the aforegoing. This aspect of the invention also includes the population in the form of a stable expanded bed according to the above, placed in a column with openings for inlet and outlet of a fluidizing flowing liquid. This second aspect includes bead populations which lack affinity groups, e.g. preactivated forms. As discussed above the beads in the population may cover a certain size and/or density range or be homogeneous with respect to these features (monodisperse).

The following experimental part discloses the manufacture of the bead population most preferred at the priority filing of this application.

Experimental Part

Synthesis

EXAMPLE 1

Preparation of a dextran solution. 53.6 of kg dextran (T40 Mw 40,000 Pharmacia Biotech AB) were added to 60 L of distilled water in a batch reactor while stirring for 20 h at 20°Error! Bookmark not defined.C.

Epoxide activation of the base matrix. The base matrix (beads, 125–315 $\mu$m) was prepared according to example 1 in WO-A-9218237 (Pharmacia Biotech AB). 3.2 L of NaOH 50% were added to a reactor containing a solution of 20 L of base matrix and 9.1 L of distilled water while stirring. The mixture was cooled to 25° C. 4.68 L of epichlorohydrin (ECH) were pumped into the reactor during about 45 min. The reaction was allowed to continue for 2 h at 25° C. The reaction mixture was then neutralised with acetic acid (pH= 6–7) and the activated base matrix washed with distilled water. Analysis showed 16.8 $\mu$mol epoxide groups/ml of gel.

Dextran coupling. 27.9 L of the dextran solution were added while stirring to a reactor containing a solution of 20 L of epoxide activated base matrix and 3.4 L of distilled water. The mixture was stirred for 1 h. 3.2 L of NaOH (50%) and 34,6 g of NaBH$_4$ were then added and the reaction permitted to continue over night (ca. 18 h). The mixture was then neutralised with acetic acid (pH=6–7) and the matrix washed with distilled water. The dextran content of the matrix after reaction was 22.0 mg/ml of gel.

EXAMPLE 2

Preparation of dextran solution. Analogous to Example 1. 56.3 kg of dextran and 60 L of distilled water.

Epoxide activation of the base matrix. Analogous to Example 1. 4.0 L of NaOH 50%, 25 L of gel and 11.4 L of distilled water. Analysis showed 22.0 $\mu$mol epoxide groups/ml of gel.

Dextran coupling. Analogous to Example 1. 39.3 L of dextran solution, 25 L of epoxide activated gel, 1.5 L of distilled water, 4.0 L of NaOH. 50% and 45.5 g NaBH$_4$. The dextran content of the base matrix after reaction was 29.0 mg/ml of gel.

EXAMPLE 3

Introduction of quaternary aminomethyl groups (Q-groups) (anion exchanger). 250 ml of glycidyltrimethyl ammonium chloride (G-MAC, 70%) were added under stirring to a solution containing 250 ml of the matrix from Example 1 and 25 ml of distilled water. The mixture was heated to 30° C. and 7.3 ml of NaOH (50%) and 0.5 g of NaBH$_4$ were added. The reaction was allowed to continue for 18 h at 30° C. The mixture was then neutralised with acetic acid (pH=6–7) and the resulting matrix washed with distilled water, 2M NaCl and with distilled water once more. The chloride ion capacity of the product was 0.21 mmol Cl$^-$/ml of gel.

EXAMPLE 4

Introduction of quaternary aminomethyl groups (Q-groups) (anion exchanger). Analogous to Example 3. 325 ml of G-MAC, 250 ml of gel from Example 1, 25 ml of distilled water, 11.6 ml of NaOH (50%) and 0.5 g of NaBH$_4$. The chloride ion capacity of the product was 0.26 mmol Cl$^-$/ml of gel.

EXAMPLE 5

Introduction of quaternary aminomethyl groups (Q-groups) (anion exchanger). Analogous to Example 3. 250 ml of G-MAC, 250 ml of gel from Example 2, 25 ml of distilled water, 7.3 ml of NaOH (50%) and 0.5 g of NaBH$_4$. The chloride ion capacity of the product was 0.24 mmol Cl$^-$/ml of gel.

EXAMPLE 6

Introduction of quaternary aminomethyl groups (Q-groups) (anion exchanger). Analogous to Example 3. 325 ml of G-MAC, 250 ml of gel from Example 2, 25 ml of distilled water, 11.6 ml of NaOH 50% and 0.5 g NaBH$_4$. The chloride ion capacity of the product was 0.33 mmol Cl$^-$/ml of gel.

EXAMPLE 7

Allylation. 55 g of NaOH, 0.9 of NaBH$_4$ and 32 g of Na$_2$SO$_4$ were added under stirring to a reactor containing 250 ml of the base matrix with extender prepared in Example 1 and 100 ml of distilled water. The mixture was heated to 45° C. After 1 h, 115 ml of allylglycidyl ether (AGE,>99%) were added. The reaction was permitted to continue for 18 h at 45° C. The mixture was then neutralised with acetic acid (pH=6–7) and the matrix washed with distilled water, ethanol and distilled water again. Analysis showed 0.19 mmol allyl groups/ml of gel.

Introduction of sulfopropyl (SP) groups (cation exchanger). 44 g of Na$_2$S$_2$O$_5$ were added with stirring to a reactor containing a mixture of 250 ml of the allylated matrix and 76 ml of distilled water. NaOH (50%) was then added until pH became 6.5. Air was bubbled through the reaction mixture using a gas dispersion tube. The reaction was maintained for 18 hours at 20° C., and the gel was then washed with distilled water. The H$^+$ capacity of the product was 0.19 mmol H$^+$/ml of gel.

EXAMPLE 8

Allylation. Analogous to Example 7. 250 ml of agarose-dextran matrix from Example 1, 100 ml of distilled water, 65 g of NaOH, 0.9 g of NaBH$_4$, 32 g of Na$_2$SO$_4$ and 135 ml of AGE. Analysis showed 0.23 mmol allyl groups/ml of gel.

Introduction of sulfopropyl (SP) groups (cation exchanger). Analogous to Example 7. 250 ml of allylated gel, 76 ml of distilled water and 44 g of Na$_2$S$_2$O$_5$. The H$^+$ capacity of the product was 0.24 mmol H$^+$/ml of gel.

EXAMPLE 9

Allylation. Analogous to Example 7. 250 ml of agarose-dextran matrix from Example 2, 100 ml of distilled water, 55 g of NaOH, 0.9 g of NaBH$_4$, 32 g of Na$_2$SO$_4$ and 115 ml of AGE were reacted as given in Example 7. Analysis showed 0.19 mmol allyl groups/ml of gel.

Introduction of sulfopropyl (SP) groups (cation exchanger). Analogous to Example 7. 250 ml of allylated gel, 76 ml of distilled water and 44 g Na$_2$S$_2$O$_5$. The H$^+$ capacity of the product was 0.19 mmol H$^+$/ml of gel.

EXAMPLE 10

Allylation. Analogous to Example 7. 250 ml of agarose-dextran matrix from Example 2, 100 ml of distilled water, 55 g of NaOH, 0.9 g of NaBH$_4$, 24 g of Na$_2$SO$_4$ and 135 ml of AGE. Analysis showed 0.23 mmol allyl groups/ml of gel.

Introduction of sulfopropyl (SP) groups (cation exchanger). Analogous to Example 7. 250 ml of allylated gel, 76 ml of distilled water and 44 g of Na$_2$S$_2$O$_5$. The H$^+$ capacity of the product was 0.24 mmol H$^+$/ml of gel.

EXAMPLE 11

The base matrix was prepared as in PCT/SE96/01431 starting with two agarose concentrations (3% and 4%, respectively).

Filler material. Anval 600® (Anval, Torshälla, Sweden) is a chromium-nickel alloy having the chemical composition (weight-%) C 0.02%, Si 0.41%, Mn 0.31%, P 0.007%, S 0.001%, Cr 15.5%, Ni 75.0%, Cu 0.02% and Fe 8.68%. The alloy has a density of 8.4 g/cm$^3$. The quality used comprised beads with diameter of 16–44 µError! Bookmark not defined.m.

Agarose mixture (4%). 900 ml of distilled water were charged to a separate reactor and 36 g of agarose were added under agitation. The mixture was heated to 95° C. until the agarose had dissolved (about one hour). 378 g Anval® were then added to the mixture which was agitated for fifteen minutes, after which the temperature was lowered to 70° C.

Emulsifying. 1050 ml of toluene were charged to an emulsifying reactor and 49.5 g of ethyl cellulose were added in a "fine jet" under agitation. The mixture was heated on a water bath to 60° C. until all ethyl cellulose had dissolved (about two hours) The speed of the agitator in the emulsifying reactor was adjusted to 130 r.p.m. whereafter the solution of agarose (70° C.) was transferred. The emulsifying process was interrupted when 95% (volume) of the beads had a diameter <200 µm (standard gel) which gave a high proportion of beads with a diameter of 80–160 µm. Heating of the water bath was then stopped and the temperature of the bath was lowered from 60 to 30° C. in about seven hours.

Working up. The beads were washed by agitation and thereafter decanted (3×) with 3 L of 99.5% ethanol. Washing of the beads was continued on nutsch with 4×2 L of ethanol with self-draining. The beads were finally transferred to distilled water, via agitation and decanting.

Cross-linking. 100 ml of 75% gel slurry and 34 g of sodium sulphate were charged to the reactor and stirred for two hours, whereafter the temperature was raised to 50° C. 1 ml of 45% NaOH solution and 0.1 g of sodium boron hydride were then added. 7 ml (10.5 g) of 45% NaOH solution and 7.5 ml of epichlorohydrin were added at the same time with the aid of a pump and over a period of six to eight hours. The reaction was allowed to continue overnight while stirring the system (for about sixteen hours) at 50° C. Upon completion of the reaction, the gel was slurried (washed) with 7×150 ml water, whereafter the gel was acidified with 60% acetic acid to pH 5–6 and wet-sieved (80–160 µm).

EXAMPLE 11A

Direct coupling of native Protein A to the base matrix. 30 ml of the base matrix (from 3% agarose) were washed with distilled water, mixed with 3.67 g NaOH dissolved in 18 ml distilled water while stirring, and the temperature was adjusted to 24° C. After some minutes, 7.2 ml of epichlorohydrin were added while vigorously stirring the mixture. After two hours, the gel was washed on a glass filter with 300 ml of distilled water. The washed gel was then mixed with 6-aminocapronic acid (6-ACS; 30 ml solution 1 M 6-ACS, 1 M NaCl pH 11.5) and the mixture stirred for 17–24 hours and then finally washed with 200 ml 0.5 M NaCl. The gel was then again washed, now with 2×30 ml acetone, whereafter the gel was mixed with 15 ml acetone and activated with 559 mg NHS and 1007 mg of dicyclohexylcarbodiimide while stirring the system. After 4–17 hours at 31° C., the gel was washed with 2×30 ml acetone+ 450 ml isopropanol and cooled with 210 ml of ice-cold 1 mM HCl. The resultant activated gel was mixed with 30 ml solution containing native Protein A (Pharmacia Biotech AB) (Protein A dissolved in 0.2 M $NaHCO_3$, 1 M NaCl pH 8), and stirred at room temperature for two hours, and then washed with Tris buffer pH 8, and acetate buffer pH 3, and finally with distilled water.

EXAMPLE 11B

Direct coupling of native Protein A to the base matrix. As in Example 11A but the base matrix had been obtained from agarose 4%.

EXAMPLE 11C

Coupling of native Protein A via an extender.

Allylation. 400 ml of distilled water, 48 g of NaOH and 0.15 g of $NaBH_4$ (solution A). 50 ml of the base matrix (agarose 3%) were washed with 200 ml of distilled water and 380 ml of solution A. 50 ml of the base matrix and 20 ml of solution A were added to a reactor. The mixture was heated to 45° C. 60 ml of AGE were added to the mixture. The reaction was allowed to continue for 18 h at 45° C. The mixture was then neutralised with acetic acid and the matrix washed with distilled water, ethanol and distilled water.

Bromination. 2 g of sodium acetate were added to a solution of 50 ml of allylated gel and 200 ml of distilled water. After 15 min of stirring, 20 ml of $Br_2/H_2O$ were added to the solution and the reaction was run for 15 min. Then sodium formiate was added to destroy excess of bromine. The gel was then washed with distilled water.

Dextran coupling. The dextran solution was prepared in a batch reactor by adding 15 g of dextran ($M_w$ 10,000 (Pharmacia Biotech AB)) to 75 ml of distilled water while stirring for 18 h at 40° C. (dextran solution). 50 ml of the brominated gel, 5 g of NaOH and 0.15 g of $NaBH_4$ were then added to the reactor containing the dextran solution (40° C.) and the reaction allowed to proceed over night (ca. 18 h) at 40° C. The mixture was then neutralised with acetic acid (pH=6–7) and the matrix washed with distilled water.

Coupling of native Protein A. Analogous to Example 11A.

EXAMPLE 11D

Preparation of dextran solution. A dextran solution was prepared in a batch reactor by adding 50 g of dextran ($M_w$ 10,000 Pharmacia Biotech AB) to 125 ml of distilled water while stirring for 18 h at 20° C.

Epoxide activation of the base matrix. 3.2 g of NaOH and 0.9 g of $NaBH_4$ were added with stirring to a reactor containing a solution of 250 ml of the base matrix and 150 ml of distilled water. The mixture was heated to 30° C. 60 ml of ECH were added to the solution. The reaction was allowed to continue for 2 hours at 30° C. The mixture was then neutralised with acetic acid (pH=6–7) and the matrix washed with distilled water.

Dextran coupling. 100 ml of the epoxide activated gel, 12 g of NaOH and 0.4 g of $NaBH_4$ were added to a reactor containing the dextran solution (30° C.). The reaction was permitted to continue over night (ca. 18 h) at 30° C. The mixture was then neutralised with acetic acid (pH=6–7) and the matrix washed with distilled water.

Coupling of native Protein A. Analogous to Example 11A.
Methods of Analysis

Epoxide contents of various gels were determined on a Radiometer VIT 90 Titrator with 0.1 M HCl, pH-stat endpoint pH 7.

Allyl contents of various gels were determined on a Mettler DL40GP Memo Titrator with 0.1 M $AgNO_3$.

Dextran contents of various gels were determined by calculation the difference between the dry weight of the dextran coupled and the epoxy activated gels. The dry weight was determined after drying 18 h in an oven at 105° C. and expressed as mg dextran per ml of gel.

Chloride ion capacity was determined on a Mettler DL40GP Memo Titrator with 0.1 M $AgNO_3$.

$H^+$ capacity was analysed on a Radiometer VIT 90 Titrator with 0.1 M HCl, pH-stat endpoint pH 7.

Breakthrough capacity $Q_B$ ($C/C_O$=0.1) for BSA (bovine serum albumin) at 400 cm/h, expanded bed.
Equipment
  Column: STREAMLINE 25 (Pharmacia Biotech AB)
  Buffer A: 50 mM Tris/HCl, pH 7.5
  Buffer B: 50 mM Tris/HCl, 2 M NaCl, pH 7.5
  Protein: BSA (InterGen Company, USA)
  Flow: 400 cm/h
Procedure The breakthrough capacity $Q_B$ was determined on a STREAMLINE®25 column (filled with sedimented gel to a height of 15 cm) at a linear flow rate of 400 cm/h. The protein was dissolved in buffer A, approximately 2 mg/ml of and the concentration was measured using a spectrophotometer at $A_{280}$.

The column was initially bypassed and the flow delivered direct to the UV monitor, in which an absorbance value 280 nm) of non-absorbed solution was measured ($C_O$), whereafter the flow together with sample was allowed to pass through the column. When the absorbance of the flow through the column (280 nm) was 10% of the absorbance $C_O$, the test was interrupted, the gel was washed and the BSA bound to the gel eluated with buffer B. The eluate was collected and its BSA content determined, which in turn gave the amount of adsorbed BSA per ml of gel (the breakthrough capacity ($Q_B$) for $C/C_O$=0.1.

Breakthrough capacity $Q_B$ ($C/C_O$=0.1) for ovalbumin at 400 cm/h, expanded bed.
Equipment
  Column: STREAMLINE 25 (Pharmacia Biotech AB)
  Buffer A: 50 mM Tris/HCl, pH 7.5
  Buffer B: 50 mM Tris/HCl, 2 M NaCl, pH 7.5
  Protein: ovalbumin (Sigma A-5503)
  Flow: 400 cm/h
Procedure
  Analogous to the procedure for BSA.
Breakthrough capacity $Q_B$ (C/CO=0.1) for lysozyme at 400 cm/h, expanded bed.
Equipment
  Column: STREAMLINE 25 (Pharmacia Biotech AB)
  Buffer A: 50 mM glycine pH 9.0
  Buffer B: 50 mM glycine, 2 M NaCl, pH 7.5
  Protein: lysozyme (Sigma L-6876)
  Flow: 400 cm/h
Procedure
  Analogous to the procedure for BSA.
Breakthrough capacity $Q_B$ ($C/C_O$=0.1) for hIgG at 400 cm/h, expanded bed.
Equipment
  Column: STREAMLINE 25 (Pharmacia Biotech AB)
  Buffer A: 50 mM sodium acetate, pH 5.0
  Buffer B: 50 mM sodium acetate, 2 M NaCl, pH 7.5

Protein: hIgG (Pharmacia & Upjohn)
Flow: 400 cm/h
Procedure
Analogous to the procedure for BSA.

The results from examples 3–10 are compared with standard gel for expanded bed (STREAMLINE® DEAE and STREAMLINEError! Bookmark not defined. SP, Pharmacia Biotech AB) and presented in table 1 and 2.

TABLE 1

Breakthrough capacity $Q_B$ ($C/C_o$ = 0.1) for BSA and Ovalbumin at 400 cm/h, expanded bed.

| Example No. | Dextran content mg dextran/ ml gel | $Cl^-$ capacity mmol $Cl^-$/ ml gel | $Q_B$ mg BSA/ ml gel | $Q_B$ mg Ovalbumin/ ml gel |
|---|---|---|---|---|
| STREAMLINE DEAE | 0 | 0.13–0.21 | 39 | 38 |
| Example 3 | 22 | 0.21 | 163 | 153 |
| Example 4 | 22 | 0.26 | 144 | 168 |
| Example 5 | 29 | 0.24 | 145 | 129 |
| Example 6 | 29 | 0.33 | 144 | 121 |

TABLE 2

Breakthrough capacity $Q_B$ ($C/C_o$ = 0.1) for lysozyme and hIgG at 400 cm/h, expanded bed.

| Example No. | Dextran content mg Dextran/ ml gel | $H^+$ capacity mmol $H^+$/ ml gel | $Q_B$ mg lysozyme/ ml gel | $Q_B$ mg/hIgG/ ml gel |
|---|---|---|---|---|
| STREAMLINE SP | 0 | 0.17–0.24 | 78[1] | 12 |
| Example 7 | 22 | 0.19 | 215 | 70 |
| Example 8 | 22 | 0.24 | 215 | 39 |
| Example 9 | 29 | 0.19 | 222 | 73 |
| Example 10 | 29 | 0.24 | 198 | 58 |

[1] Breakthrough capacity $Q_B$ ($C/C_o$ = 1.0) are 120 mg lysozyme/ml of gel.

Conclusion

From tables 1 and 2 it can be seen that the inventive principle may result in matrixes with more then three times higher breakthrough capacity $Q_B$ than conventional gels used in expanded bed chromatography.

For matrixes with native protein A preliminary experiments showed an effect that was null or only marginal with respect to increase in breakthrough capacity (packed bed) by the use of an extender. This may depend on the fact that the extender used (dextran Mw 10,000 Da) was much smaller than the affinity structure as such (protein A, Mw about 40,000 Da). Results not presented.

What is claimed is:

1. A method for adsorbing a substance, in a liquid sample, to a non-packed bed containing beads said beads comprising a base matrix, extenders, and ligands having affinity to said substance, wherein said ligands are covalently bound to said base matrix via said extenders.

2. A method according to claim 1, wherein said beads contain filler particles.

3. The method according to claim 1, wherein said non-packed bed is a fluidized expanded bed.

4. The method according to claim 3, wherein said fluidized expanded bed is a stabilized expanded bed.

5. The method of claim 4, wherein said stabilized expanded bed is stabilized by a flow of fluid evenly distributed across the cross-sectional area of the bed.

6. The method according to claim 3, wherein said fluidized expanded bed is a turbulent expanded bed.

7. The method according to claim 1, wherein said non-packed bed is a stirred suspension.

8. The method according to claim 1, wherein said extenders are a polymer and each extender carries two or more ligands with affinity to the substance to be adsorbed.

9. The method according to claim 8, wherein said polymer is of non-polypeptide structure.

10. The method according to claim 1, wherein said beads are porous.

11. The method according to claim 1, wherein said ligands are selected from the group consisting of cationic groups and anionic groups.

12. The method according to claim 1, wherein said ligands are selected from the group consisting of:
 a. Positively charged groups,
 b. Negatively charged groups,
 c. Amphoteric groups,
 d. Groups having a specific affinity,
 e. Complementary nucleic acids/oligonucleotides,
 f. Groups which exhibit π-electron systems,
 g. Chelate groups, and
 h. Hydrophobic groups.

13. The method of claim 12 wherein said positively charged groups are selected from the group consisting of primary groups, secondary groups, tertiary groups and quarternary amine groups.

14. The method of claim 12 wherein said negatively charges groups are selected from the group consisting of carboxy groups, pahosphonic acid groups and sulphonic acid groups.

15. The method of claim 12 wherein said groups having a specific affinity are selected from the group consisting of bio-affinity groups.

16. The method of claim 15 wherein said bio-affinity groups are selected from the group consisting of IgG-binding proteins, IgG, lectin, carbohydrates, antigen, hapten, strepaviden and biotin.

17. A population of beads wherein said beads contain a filler incorporated in a base matrix and extenders, wherein said extenders carry ligands covalently bound to said extenders.

18. The population of beads according to claim 17, wherein, if present, intra- and intermolecular crosslinks in the extenders derive from crosslinking of the extenders before attaching the extenders to the base matrix.

19. The population of beads according to claim 17, wherein said beads are porous.

20. The population of beads according to claim 17, wherein said ligands are selected from the group consisting of:
 a. Positively charged groups,
 b. Negatively charged groups,
 c. Amphoteric groups,
 d. Groups having a specific affinity,
 e. Complementary nucleic acids/oligonucleotides,
 f. Groups which exhibit π-electron systems,
 g. Chelate groups, and
 h. Hydrophobic groups.

21. The population of beads of claim 20 wherein said positively charged groups are selected from the group consisting of primary groups, secondary groups, tertiary groups and quarternary amine groups.

22. The population of beads of claim 20 wherein said negatively charges groups are selected from the groups consisting of carboxy groups, pahosphonic acid groups and sulphonic acid groups.

23. The population of beads of claim 20 wherein said groups having a specific affinity are selected from the group consisting of bio-affinity groups.

24. The population of beads of claim 23 wherein said bio-affinity groups are selected from the group consisting of IgG-binding proteins, IgG, lectin, carbohydrates, antigen, hapten, strepaviden and biotin.

25. The population of beads according to claim 17, wherein said ligands are selected from the group consisting of cationic groups and anionic groups.

26. The population of beads according to claim 17, wherein said extenders are a polymer and each extender carries two or more ligands.

27. The population of beads according to claim 17, wherein said extenders are a polymer of non-polypeptide structure.

* * * * *